United States Patent [19]

Buczek et al.

[11] 3,757,251
[45] Sept. 4, 1973

[54] DIRECT CURRENT AUXILIARY IONIZATION OF AN AXIALLY EXCITED FLOWING GAS LASER

[75] Inventors: Carl J. Buczek, Manchester; Peter P. Chenausky, Farmington; Robert J. Freiberg, South Windsor, Robert J. Wayne, East Hartford, all of Conn.

[73] Assignee: United Aircraft Corporation, East Hartford, Conn.

[22] Filed: July 21, 1971

[21] Appl. No.: 164,544

[52] U.S. Cl. ................................. 331/94.5, 330/4.3
[51] Int. Cl. ........ H01s 3/09, H01s 3/10, H01s 3/22
[58] Field of Search ...................... 331/94.5; 330/4.3

[56] References Cited
UNITED STATES PATENTS

| | | | |
|---|---|---|---|
| 3,588,740 | 7/1971 | Bell | 331/94.5 |
| 3,428,914 | 2/1969 | Bell | 331/94.5 |
| 3,530,398 | 9/1970 | Itzkan et al. | 331/94.5 |
| 3,548,335 | 12/1970 | Willett | 331/94.5 |
| 3,569,858 | 3/1971 | Witteman et al. | 331/94.5 |

OTHER PUBLICATIONS

Huchital et al., "IEEE J. of Quantum Electronics" Vol. QE-3, No. 9, Sept. 1967, pp. 378–9 QC44712.

Boczek et al., "Applied Physics Letters" Vol. 16, No. 8, 15 April 1970, pp. 321–3 QC1A457.

*Primary Examiner*—David Schonberg
*Assistant Examiner*—R. J. Webster
*Attorney*—Anthony J. Criso

[57] ABSTRACT

A high efficiency electric discharge gas laser which is capable of high power pulses and high repetition rates is disclosed. A region of high electrical conductance is provided in a laser gas along the axis of the laser optical cavity by a low current auxiliary ionization discharge, and a high voltage, high current pulsed power source produces an electric plasma having a population inversion throughout the region. Fins are positioned in the cavity to confine the cross section of the plasma and to maintain the plasma around the cavity axis. In one configuration in which the gas flow is transverse to the optical axis, a magnetic field which is orthogonal to both the direction of gas flow and the optical axis is used to counteract the downstream bowing effect in the plasma caused by the gas flow. In a high pressure embodiment of the invention, multiple electric discharges are arranged in parallel along the axis of the laser to provide the necessary pumping of the laser gas.

4 Claims, 3 Drawing Figures 3,757,251

DIRECT CURRENT AUXILIARY IONIZATION OF AN AXIALLY EXCITED FLOWING GAS LASER

BACKGROUND OF THE INVENTION

1. Field of the Invention

This invention relates to gas lasers and more particularly to a high efficiency gas laser capable of producing output pulses of high power at a high repetition rate.

2. Description of the Prior Art

Various forms of gas lasers have been discussed and provded workable during the past few years, and much of the present laser effort is concerned with improving the characteristics and feasibility of known workable systems. For example, laser pulses containing a peak power above one megawatt have been produced in a carbon dioxide gas laser system; additional research is being conducted to extend the power and efficiency of such systems.

Generally speaking, as more power is transferred to a laser medium, more power can theoretically be removed from the medium in the form of laser energy. However, there are limitations to the amount of useful power transferable to a lasing gas. For example, in a nonflowing or sealed gas laser system, the amount of useful energy which can be accepted by the lasing gas is limited in part by the ability of the gas to reject unusable energy usually in the form of heat. As is well known in the art, lasing can occur when a nonequilibrium condition in which the population of upper energy levels is caused to exceed the population of lower energy levels is established in a laser material; that is an energy level distribution commonly referred to as a population inversion. As lasing occurs, the lower energy level population tends to increase, the upper energy level population tends to decrease and the degree of population inversion is reduced unless a dynamic equilibrium condition can be established. A main concern in the pumping of an efficient laser is to maximize the population of the upper laser level and to minimize the lower laser level.

One method of reducing population in a lower laser energy level of a gas laser medium is to transfer energy from the molecules in the lower laser level and cause these molecules to assume a different and still lower energy level. The energy transfer is often accomplished by interacting the molecules with the walls of the laser cavity containing the gas. This system has been used extensively, however, the rate of energy transfer to the walls is limited by diffusion phenomena and therefore the laser output power is similarly limited. One technique for enhancing this rate used an axial magnetic field to increase the wall collision rate as is discussed in the copending application of Bullis et al, U.S. application Ser. No. 216,303 filed on Jan. 7, 1962, and held with the present application by a common assignee.

An alternate method of reducing the lower laser level population is to flow the laser gas through the optical cavity, commonly referred to as a convection laser system, thereby physically removing the gas in a lower laser energy level. While this method is effective, it can interfere with the transfer of pumping energy into the lasing gas. For example, in an electric discharge laser, ionization of the laser gas is essential to the transfer of electrical energy to the upper laser energy level of the gas. When the lasing gas is being flowed through the optical cavity, particularly at high flow rates, ions are swept out of the electric discharge region and the transfer of electrical energy to the laser gas is inhibited.

SUMMARY OF THE INVENTION

A principal object of the present invention is to increase the overall efficiency of a gas laser having a pulsed output. A further object of the present invention is to increase the amount of pumping energy coupled into a gas laser with an electric discharge, in order to increase the peak power contained in the laser output pulses.

According to the present invention, a low current electric discharge is continuously applied to a gas along the optical axis of a laser in order to provide auxiliary ionization to the laser gas, the auxiliary ionization providing a path of high electrical conductance along which pulses of high voltage, high current pumping energy are applied to create a population inversion in the laser gas.

A main feature of the present invention is that a steady state, direct current, auxiliary ionization is provided along a path over which the main excitation energy is applied to the laser gas in a pulsed manner. In addition, the electric discharge which provides the auxiliary ionization is operated as a low voltage, low current discharge. The laser has a pulsed output and is capable of high pulse repetition rates having excellent pulse-to-pulse reproducibility; the peak power contained in successive pulses is high and it is essentially constant from pulse to pulse. The invention is further characterized in that the volume of laser gas that is subject to auxiliary ionization is limited to the approximate limits of the laser optical cavity. Further, the electrical pumping system for creating the population inversion in the high pressure embodiment is operated at relatively low discharge voltages.

The foregoing and other objects, features and advantages of the present invention will become more apparent in the light of the following detailed description of preferred embodiments as illustrated in the accompanying drawing.

DESCRIPTION OF A PREFERRED EMBODIMENT

Figure 1:
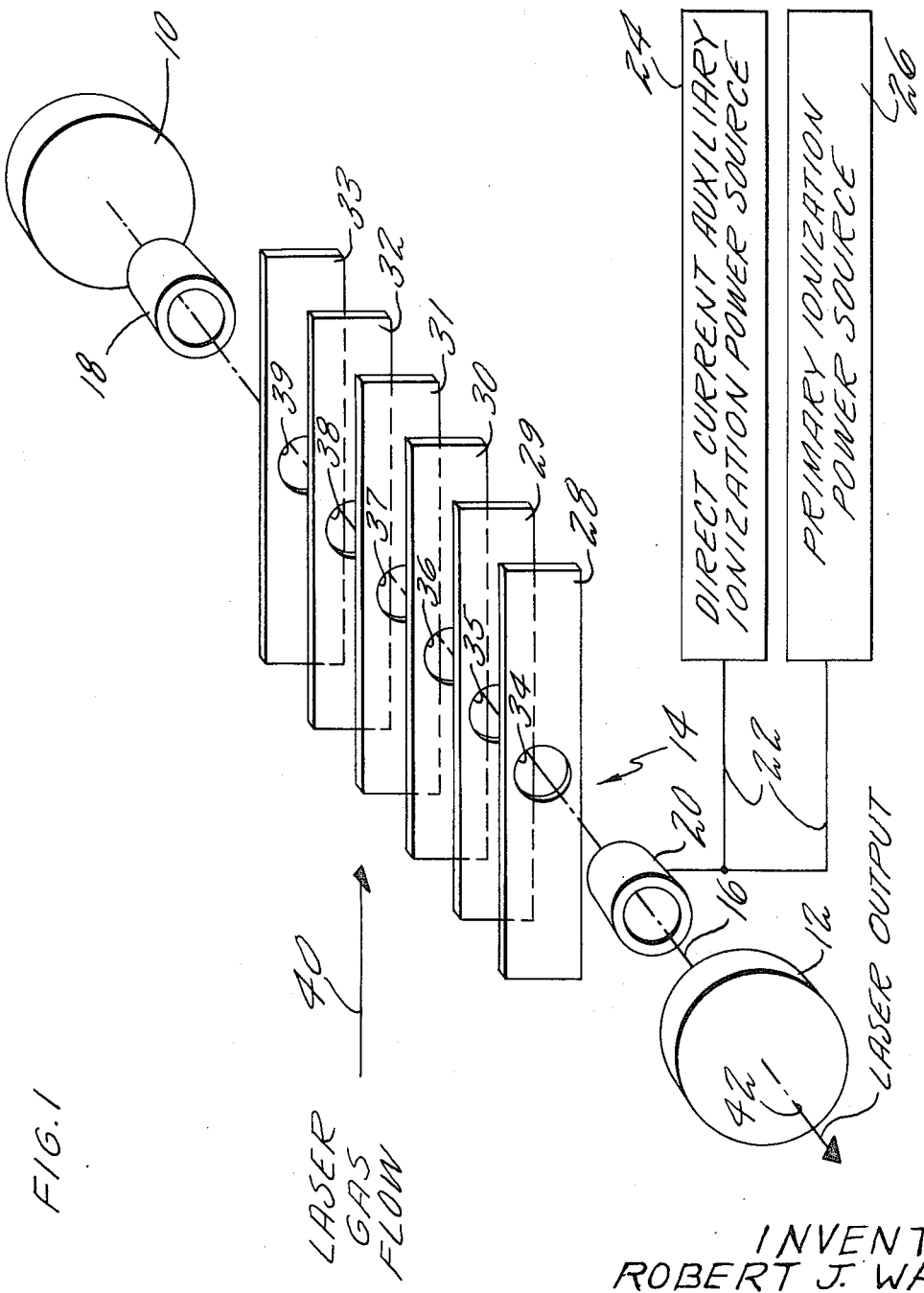
FIG. 1 is a simplified schematic diagram of a transverse flow gas laser in accordance with the present invention.

The present invention can be practiced with a transverse flow electric discharge gas laser as is shown in FIG. 1. A pair of resonator mirros 10, 12 define the ends of an optical cavity shown by general reference character 14 having a centrally located optical axis 16. A pair of hollow electrodes comprising an anode 18 and a cathode 20 is located symmetrically about the optical axis; the cathode is connected by wires 22 to both a direct current auxiliary ionization power source 24 and a primary ionization power source 26. Disposed about the optical axis 16 is a plurality of fins 28–33, each fin having a corresponding hole 34–39 which is also symmetrically located about the axis 16. The fins are preferably of thin dielectric material; they are positioned substantially perpendicular to the optical axis and each fin extends several hole diameters to each side of the optical axis in the gas flow direction.

In the operation of the device shown in FIG. 1, a laser gas having a flow direction 40 is passed between the electrodes 18, 20 in a direction parallel to the fins 28–33. An electric plasma is created between the electrodes 18, 20 in the optical cavity 14 by the application of an electric current which is typically less than about .5 milliamperes and is provided by the direct current power source 24. The power source 24 is operated as follows. Initially the voltage is set above the threshold value required to initiate breakdown in the laser gas between the electrodes 18, 20. Once a discharge has been initiated, both the voltage and current are reduced to a value just sufficient to maintain the discharge between the electrodes thereby producing the necessary auxiliary ionization. When auxiliary ionization is present in the optical cavity, the need and drawbacks of generating ions to increase the conductivity of the laser gas sufficiently at the time that the pulsed pumping power is applied as is normally the case, are eliminated. Thus, the invention makes possible laser pulses which have excellent repeatability characteristics, including even the first several initial pulses.

The holes 34–39 control the size and the path of the discharge produced along the optic axis by the power source 24. The size of the discharge must be matched to the laser mode size which in turn is dictated by the characteristics of the optical cavity 14; the correlations between optical cavity parameters and laser mode size are known in the art and form no part of this invention. However, if the cross section of the holes 34–39 is smaller than the cross section of the particular mode in which the cavity wants to oscillate, laser action will be quenched although the electric discharge action will persist. On the other hand, if the cross section of the holes 34–39 is larger than the laser mode cross section, laser action can occur but the discharge cross section will exceed the laser mode cross section and some of the electric pumping energy transferred to the gas will be wasted thereby reducing the system efficiency. In the present invention, it is important to match the fin hole size to the laser mode size, the latter being determined by the optical cavity characteristics.

At appropriate times, the primary ionization power source 26 provides a pulsed source of ionization potential between the electrodes 18, 20 causing a population inversion in the ionized gas then present in the optical cavity 14, said pulsed ionization having sufficient power to cause a population inversion which allows laser oscillation between the mirrors 10, 12. The mirror 12 is a partially transmitting mirror and a pulsed output 42 of laser energy is produced.

Maintaining a continuous flow of laser gas in the direction 40 removes excess heat from the laser cavity and avoids buildup of gas molecules in the lower laser level, a condition which is detrimental to the lasing process. If the laser gas is flowed very rapidly, in excess of about 10 meters per second, the electric discharge does not remain symmetrically positioned about the optical axis 16 between the electrodes 18, 20; rather, the discharge tends to be blown downstream between each of the adjacent fins 28–33. Any portion of the electrically excited laser gas which is outside of the optical cavity, is unused in the laser process, a wasteful and undesired condition that can be counteracted by applying a magnetic field along the optical axis 16 and transverse to the flow of laser gases. This technique is taught in the copending application of Pinsley et al., Ser. No. 216,302 which was filed on Jan. 7, 1972 and is held with the present invention by a common assignee. Although the embodiment of the present invention as shown in FIGS. 1 and 2 is a transverse flow arrangement, an axial flow configuration has also been operated successfully.

Figure 2:
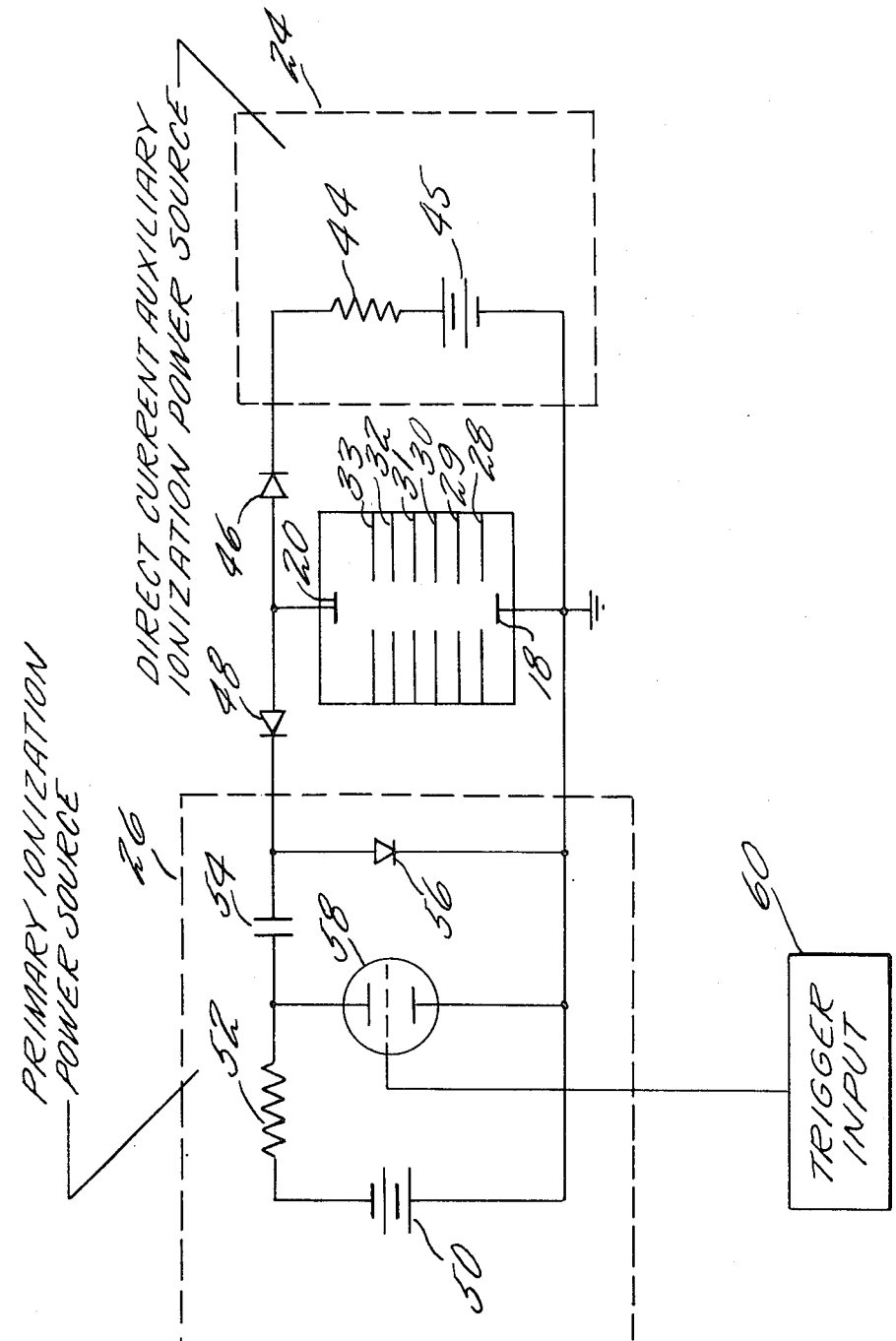
FIG. 2 is a simplified schematic diagram of the gas laser shown in FIG. 1 with the auxiliary ionization circuit and the pulser ionization circuit.

FIG. 2 is a schematic diagram of the auxiliary ionization power source 24 and the primary ionization power source 26. The direct current from the auxiliary ionization source must apply a sufficient voltage to break down the laser gas between the electrodes 18, 20, however, arcing in the discharge is detrimental and to be avoided. An electrical resistance 44 serves to limit the direct current drawn from a source 45 to a magnitude which is just sufficient to maintain the discharge thereby providing sufficient ionization for pulsed operation between the electrodes. In order to improve the reliability of the auxiliary ionization source and to isolate it from the primary ionization source, diodes 46 and 48 are used. The primary ionization source draws current from a dc supply 50; a resistance 52 serves to limit the current to an acceptable level while a capacitor 54 is being charged. A diode 56 provides suitable isolation for the energy discharge from the capacitor when it is triggered by a thyratron 58 which receives a signal from a trigger impulse 60.

It is known in the art that as the gas pressure is increased in an electric discharge laser, higher excitation voltages are required in order to maintain a preferred ratio of electric field strength to gas pressure; as the pressure increases, the lifetime of the upper laser level of the laser gas decreases and therefore the rise time of the excitation pulses must be increased accordingly. If the rise time of the excitation pulse is too long, some of the excited or upper energy levels will revert to the lower energy levels by mechanisms which compete with the laser process and the desired inverted population cannot be established.

The ideal ratio of electric field gradient to laser gas pressure remains unchanged even though the pressure at which the laser is operated is increased. Thus, low voltage power supplies can be used in high pressure application by locating several discharges in series along the optical axis.

Figure 3:
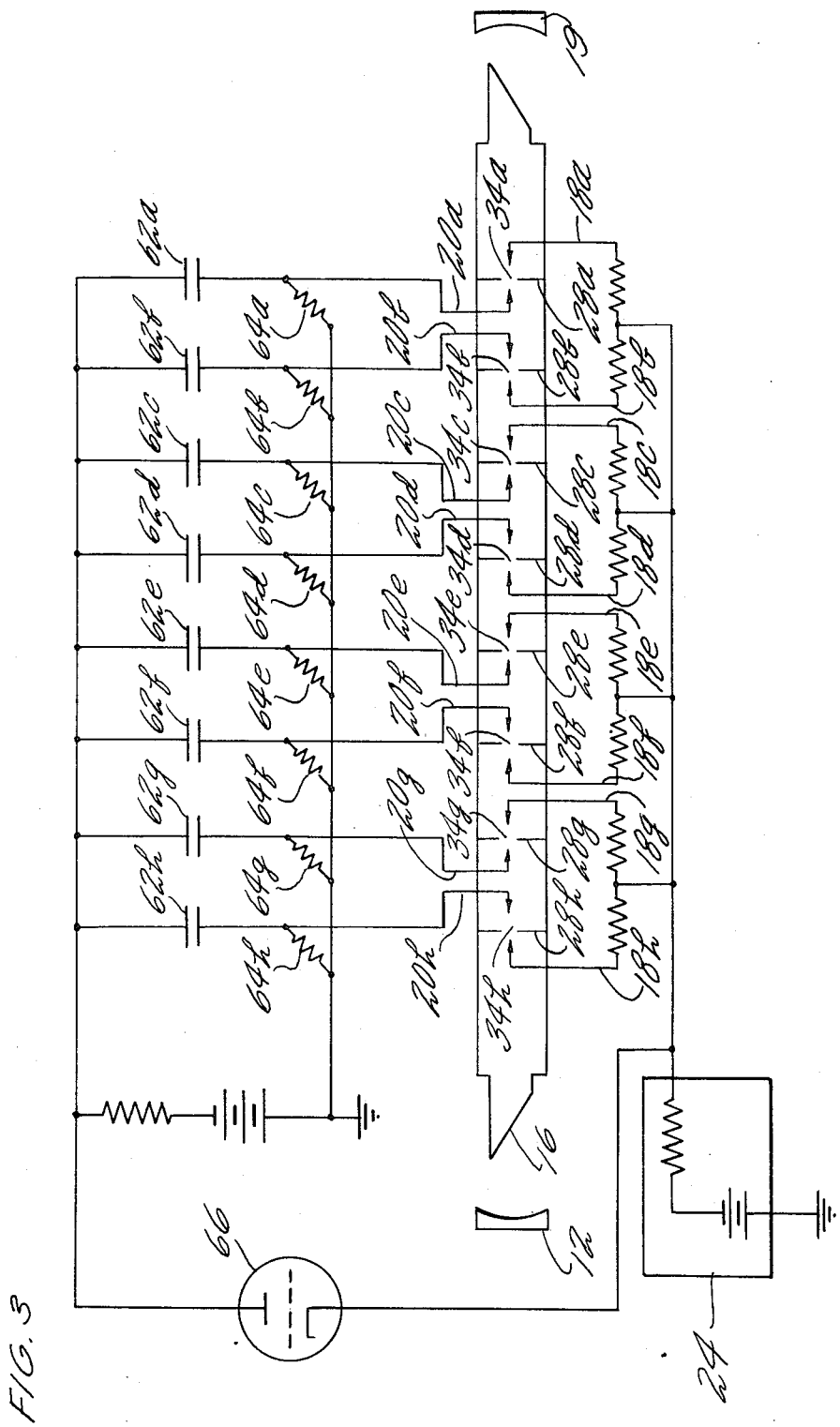
FIG. 3 is a simplified schematic diagram of a high pressure gas laser in accordance with the present invention in which a plurality of pairs of electrodes is used to electrically excite the laser gas.

FIG. 3 is a schematic diagram of an electric circuit suitable for implementation of the present invention at relatively high gas pressure, typically about 1 atmosphere. A series of individual low voltage discharges is established between the electrodes 18a–h, 20a–h to excite the laser along the optical axis 16. In order to insure uniformity of pulsed discharges, each electrode pair is driven by its own fast rise high voltage capacitor 62a–h; each electrode pair also has a resistor 64a–h to isolate the pairs of electrodes from one another and insure uniform pulsing between the electrodes. The capacitors 62a–h are charged to a voltage in excess of that required for breakdown of the laser gas between the electrode pairs and a small resistance-capacitance time constant allows for short rise time pulses. The discharge breakdown across the individual electrode pairs is controlled by a thyratron 66 which is capable of a high peak current and a high pulse repetition rate; activation of the thyratron causes the energy stored in the capacitor 62 to be discharged instantaneously across the electrodes 18, 20. A direct current auxiliary ionization power source 24 maintains a discharge between the electrode pairs to provide a high conductance path for the pulsed discharge, and between each pair of electrodes is a fin 28 having an aperture 34 which limits the size of this discharge to the approximate dimensions of the aperture.

One of the transverse flow systems operated in accordance with the present invention with carbon dioxide gas was shown to have better than a three-fold increase in both the average output power and peak power per pulse when the same system was operated with and without auxiliary ionization. In this system, an auxiliary ionization power source having a 30 kilovolt direct current capacity was operated with a 5 milliampere current limiting electrical resistance in the circuit. A power source capable of a 40 amperes, at 30 kilovolts pulsed output at a 0.5–5 microsecond duration and a repetition rate determined by the maximum duty cycle of $2 \times 10^{-3}$ provided the primary ionization power. With a separation distance between electrodes of 30 centimeters and the optical cavity pressures up to 50 Torr, the gas flow velocity was varied over the range zero to 50 meters per second. The maximum average laser output power was observed when the electric field gradient to gas pressure ratio was approximately 20 volts per centimeter Torr.

Although the invention has been shown and described with respect to preferred embodiments thereof, it should be understood by those skilled in the art that various changes and omissions in the form and detail thereof may be made therein, without departing from the spirit and scope of the invention.

Having thus described a typical embodiment of our invention, that which we claim as new and desire to secure by Letters Patent of the United States is:

1. In the method of operating a pulsed gas laser in which gas is electrically exicted in the resonant optical cavity of the laser, said cavity having a characteristic internal, self consistent, electromagnetic field laser mode distribution configuration and an optical axis about which a pair of spaced apart hollow electrodes is coaxially disposed, the steps of:

flowing a quantity of the gas between said electrodes in a direction which is transverse to the optical axis;

providing a continuous direct current electric discharge between said electrodes to ionize the gas therebetween and provide a region of high electrical conductance in the cavity along said axis;

providing a pulsed electric current discharge in said region of high conductance between the electrodes to produce in the cavity an electric plasma having a population inversion whereby stimulated emission of pulsed laser energy is produced;

positioning the plasma substantially parallel to the optical axis;

confining the cross-sectional area of the plasma to substantially the cross-sectional area of the mode distribution; and applying a magnetic field transverse to both the optical axis and the direction of gas flow.

2. A gas laser apparatus for providing a pulsed output of laser energy with a gas working medium comprising:

a resonant optical cavity having an optical axis and a characteristic, internal, self consistent, electromagnetic field laser mode distribution and capable of providing an output of pulsed laser power from an electrically excited gas;

a pair of hollow electrodes coaxially disposed about the optical axis;

means for delivering the gas to and removing the gas from the cavity and for flowing the gas in a direction which is transverse to the optical axis;

means for applying to said electrodes a continuous electric current which is capable of producing a region of high electrical conductance along said axis in the gas provided to said cavity;

means for applying a pulsed electric current to said electrodes to produce along said axis an electric plasma having a population inversion which is capable of lasing;

means location in the flowing gas for positioning the plasma with respect to the optical axis and confining the cross section of the plasma to substantially match the cross section of said mode distribution; and means providing a magnetic field transverse to both the optical axis and the direction of the gas flow.

3. The laser according to claim 2 wherein said means for positioning and confining the cross section of the plasma comprises a plurality of fins which are spaced apart from one another and positioned perpendicular to the optical axis, between said electrodes, each fin having a hole therein and extending at least several hole diameters on either side of the hole in the flow direction, each hole being disposed symmetrically about said axis and having a cross section substantially identical with the cross section of said mode distribution.

4. In a flowing gas laser apparatus which includes:

a resonant optical cavity having an optical axis and a characteristic, internal, self consistent, electromagnetic field, laser mode distribution;

electrodes coaxially disposed about the optical axis;

means for delivering gas to and removing the gas from the cavity; and means for establishing an electric potential between the electrodes to produce an electric plasma along the axis, the improvement comprising:

means for positioning and confining the cross section of the plasma comprising a plurality of fins which are spaced apart from one another and positioned perpendicular to the optical axis, each fin having a hole therein and extending at least several hole diameters on either side of the hole which is disposed symmetrically about the axis and has a cross section substantially identical with the cross section of the mode distribution.

* * * * *

UNITED STATES PATENT OFFICE
CERTIFICATE OF CORRECTION

Patent No. 3,757,251           Dated September 4, 1973

Inventor(s) CARL J. BUCZEK, PETER P. CHENAUSKY, ROBERT J. FREIBERG and ROBERT J. WAYNE It is certified that error appears in the above-identified patent and that said Letters Patent are hereby corrected as shown below:

Col. 1, line 32      "that" should read -- this --

Col. 1, line 55      "1962" should read -- 1972 --

Col. 2, line 58      "mirros" should read -- mirrors --

Signed and sealed this 18th day of December 1973.

(SEAL)
Attest:

EDWARD M. FLETCHER, JR.
Attesting Officer

RENE D. TEGTMEYER
Acting Commissioner of Patents